United States Patent
Ikeda (10) Patent No.: US 11,095,201 B2
(45) Date of Patent: Aug. 17, 2021

(54) DRIVE DEVICE AND METHOD FOR CONTROLLING DRIVE DEVICE

(71) Applicant: SHINDENGEN ELECTRIC MANUFACTURING CO., LTD., Tokyo (JP)

(72) Inventor: Masataka Ikeda, Saitama (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/962,387

(22) PCT Filed: Sep. 6, 2018

(86) PCT No.: PCT/JP2018/032956
§ 371 (c)(1),
(2) Date: Jul. 15, 2020

(87) PCT Pub. No.: WO2019/146149
PCT Pub. Date: Aug. 1, 2019

(65) Prior Publication Data
US 2021/0075309 A1 Mar. 11, 2021

(30) Foreign Application Priority Data
Jan. 23, 2018 (WO) ................ PCT/JP2018/001897

(51) Int. Cl.
*H02M 1/08* (2006.01)
*H02M 1/38* (2007.01)
*H02M 3/07* (2006.01)

(52) U.S. Cl.
CPC ............ *H02M 1/08* (2013.01); *H02M 1/38* (2013.01); *H02M 3/07* (2013.01)

(58) Field of Classification Search
CPC ............ H02M 1/08; H02M 1/38; H02M 3/07
(Continued)

(56) References Cited

U.S. PATENT DOCUMENTS

2017/0012626 A1* 1/2017 Dighrasker .......... H03K 17/687

FOREIGN PATENT DOCUMENTS

| JP | S56145382 U | 11/1981 |
| JP | S62132687 U | 8/1987 |

(Continued)

OTHER PUBLICATIONS

International Application No. PCT/JP2018/032956, International Search Report, dated Nov. 27, 2018.
(Continued)

*Primary Examiner* — Tomi Skibinski
(74) *Attorney, Agent, or Firm* — Marshall, Gerstein & Borun LLP (57) ABSTRACT

A drive device includes a first gate driver circuit that controls operations of the first transistor by outputting a first control signal to a control terminal of the first transistor; a second gate driver circuit that controls operations of the second transistor so that the first transistor and the second transistor are turned on/off in a complementary manner, by outputting a second control signal to the control terminal of the second transistor; and a first charge pump circuit that applies the first negative power supply voltage to the first negative power supply wiring, by generating the first negative power supply voltage having a polarity opposite to that of the first positive power supply voltage with reference to a potential of the output terminal, based on the first control signal.

15 Claims, 5 Drawing Sheets

(58) Field of Classification Search
USPC .......................................... 327/536, 390, 589
See application file for complete search history.

(56) References Cited

FOREIGN PATENT DOCUMENTS

| | | |
|---|---|---|
| JP | H05-122923 A | 5/1993 |
| JP | H06-098560 A | 4/1994 |
| JP | 2005-150934 A | 6/2005 |
| JP | 2009-219269 A | 9/2009 |
| JP | 2010-035387 A | 2/2010 |
| JP | 2016-67194 A | 4/2016 |
| JP | 2017-509293 A | 3/2017 |
| WO | WO-2015/116031 A1 | 8/2015 |

OTHER PUBLICATIONS

International Application No. PCT/JP2018/032956, International Preliminary Report on Patentability, dated Aug. 6, 2020.
Japanese Patent Application No. 2019-567837, Notification of Reason for Rejection, dated Jun. 22, 2021.

\* cited by examiner

DRIVE DEVICE AND METHOD FOR CONTROLLING DRIVE DEVICE

TECHNICAL FIELD

The present invention relates to a drive device and a method for controlling a drive device.

BACKGROUND ART

Conventionally, there is a driving device that controls the high side transistor and the low side transistor to be turned on/off in a complementary manner (see, for example, JP A 2016-67194).

In this conventional drive device, when the above-mentioned two transistors (n-channel FET) are turned on/off and the high-side transistor turns on, the source potential of the high side transistor and the drain potential of the low side transistor rise, and dv/dt rises.

At this time, the gate potential of the low-side transistor rises due to the current flowing through the drain-gate parasitic capacitance of the low side transistor and the gate resistance.

Then, when the gate potential exceeds the threshold voltage Vth of the low side transistor, the low side transistor is turned on, and the high side transistor and the low side transistor are arm-shorted.

Figure 4:
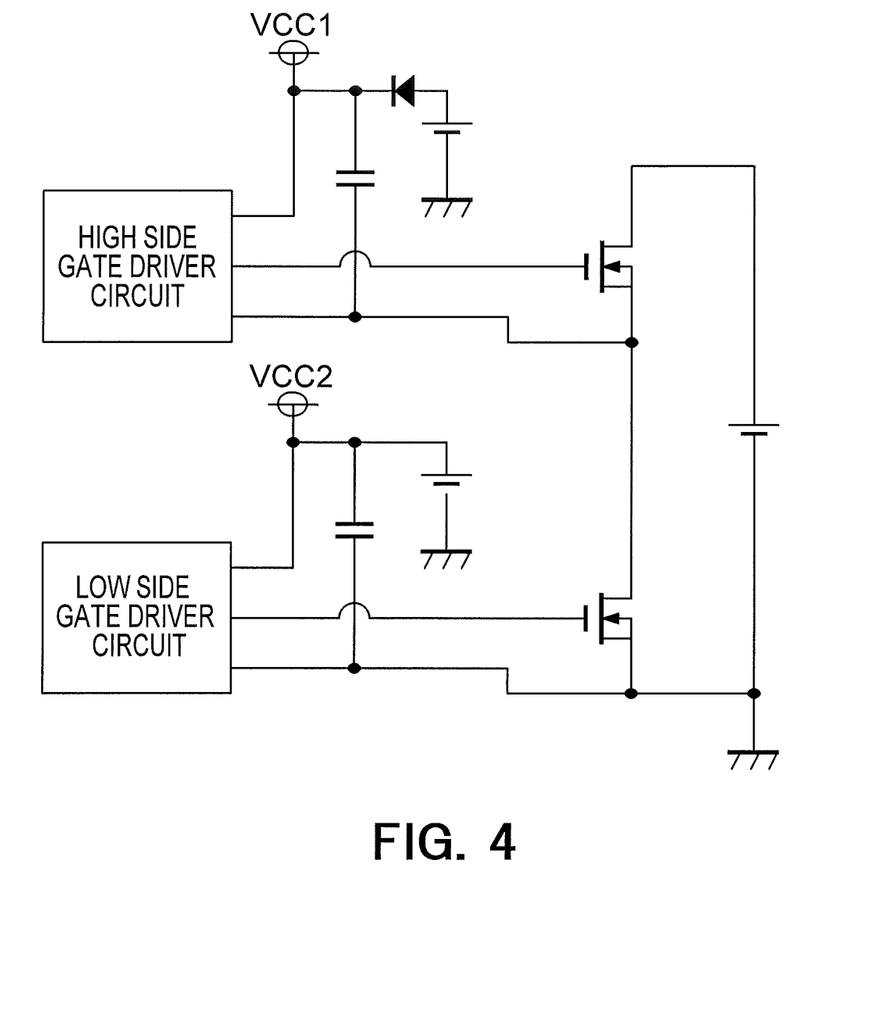
FIG. 4 is a diagram showing an example of the configuration of a conventional drive device.

Here, for example, in a conventional drive device (FIG. 4), there is one that reduces the circuit scale of an auxiliary power supply for turning on/off a transistor, by applying a bootstrap power supply, by configuring with a single power supply.

Figure 5:
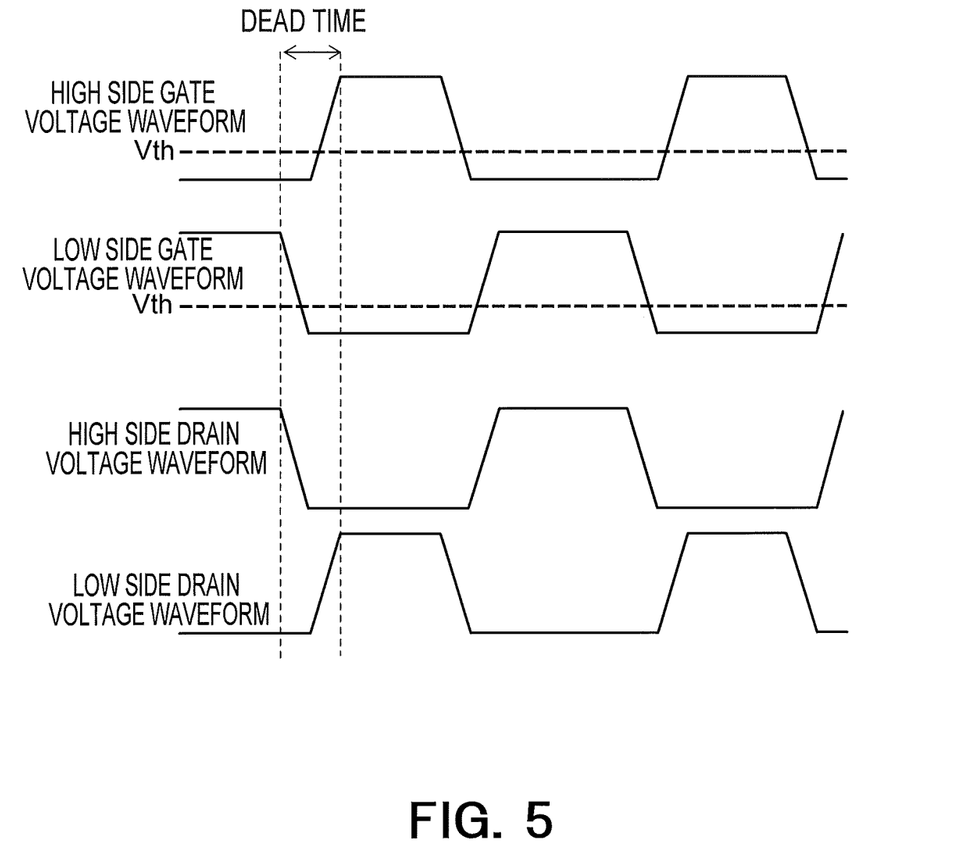
FIG. 5 is a diagram showing an example of operation waveforms of the conventional drive device shown in FIG. 4.

However, this conventional drive device cannot generate a negative power supply, so it is necessary to increase the dead time (FIG. 5).

As described above, the conventional drive device has a problem that the malfunction of the transistor cannot be suppressed in a short dead time while reducing the circuit scale.

DISCLOSURE OF THE INVENTION

Problem to be Solved by the Invention

Therefore, an object of the present invention is to provide a drive device capable of suppressing malfunction of a transistor in a short dead time while reducing the circuit scale.

Solution to Problem

A drive device according to an embodiment according to an aspect of the present invention includes:

a power supply terminal to which a DC voltage is applied;

a grounding terminal that is grounded;

a first transistor having one end connected to the power supply terminal, and having the other end connected to an output terminal;

a second transistor having one end connected to the output terminal, and having the other end connected to the ground terminal;

a first DC power supply that outputs a first voltage;

a first bootstrap circuit that comprises a first bootstrap diode having an anode applied the first voltage and a cathode connected to the first positive power supply wiring, and that comprises a first bootstrap capacitor having one end connected to the cathode of the first bootstrap diode and the other end connected to the output terminal;

a first stabilizing capacitor having one end connected to the output terminal, and having the other end connected to the first negative power supply wiring;

a first gate driver circuit that controls operations of the first transistor by outputting a first control signal to a control terminal of the first transistor, the first control signal being generated from a first positive power supply voltage of the first positive power supply wiring and a first negative power supply voltage of the first negative power supply wiring;

a second gate driver circuit that controls operations of the second transistor so that the first transistor and the second transistor are turned on/off in a complementary manner, by outputting a second control signal to the control terminal of the second transistor, the second control signal being generated from the second positive power supply voltage of the second positive power supply wiring and the second negative power supply voltage of the second negative power supply wiring; and a first charge pump circuit that applies the first negative power supply voltage to the first negative power supply wiring, by generating the first negative power supply voltage having a polarity opposite to that of the first positive power supply voltage with reference to a potential of the output terminal, based on the first control signal.

In the drive device, wherein the first transistor is a first n-channel MOS transistor having one end connected to the power supply terminal and the other end connected to the output terminal, and wherein the second transistor is a second n-channel MOS transistor having one end connected to the output terminal and the other end connected to the ground terminal.

In the drive device, a second stabilizing capacitor having one end connected to the cathode of the first bootstrap diode, and having the other end connected to the first negative power supply wiring.

In the drive device, the drive device further comprising:

a second DC power supply that outputs a second voltage;

a second bootstrap circuit that comprises a second bootstrap diode having an anode applied the second voltage and having a cathode connected to the second positive power supply wiring, and a second bootstrap capacitor having one end connected to the cathode of the second bootstrap diode and having the other end connected to the ground terminal;

a third stabilizing capacitor having one end connected to the ground terminal, and having the other end connected to a second negative power supply wiring;

a fourth stabilizing capacitor having one end connected to the cathode of the second bootstrap diode, and having the other end connected to the second negative power supply wiring; and a second charge pump circuit that applies the second negative power supply voltage to the second negative power supply wiring, by generating the second negative power supply voltage having a polarity opposite to that of the second positive power supply voltage with reference to the potential of the ground terminal, based on the second control signal.

In the drive device, wherein the first charge pump circuit is connected to the first positive power supply wiring, the first negative power supply wiring, the control terminal of the first transistor, and the output terminal.

In the drive device, wherein the second charge pump circuit is connected to the second positive power supply wiring, the second negative power supply wiring, the control terminal of the second transistor, and the ground terminal.

In the drive device, wherein a capacitance value of the first bootstrap capacitor is set to be equal to a capacitance value of the first stabilizing capacitor.

In the drive device, wherein a capacitance value of the second bootstrap capacitor is set to be equal to a capacitance value of the third stabilizing capacitor.

In the drive device, wherein a capacitance value of the first stabilizing capacitor is set to be larger than a capacitance value of the second stabilizing capacitor.

In the drive device, wherein a capacitance value of the third stabilizing capacitor is set to be larger than a capacitance value of the fourth stabilizing capacitor.

In the drive device, wherein the first gate driver circuit PWM-controls the operation of the first transistor by the first control signal, and wherein the second gate driver circuit PWM-controls the operation of the second transistor so that the first transistor and the second transistor are turned on/off in a complementary manner, by the second control signal.

In the drive device, wherein, in the relationship between the PWM control of the first transistor by the first control signal and the PWM control of the second transistor by the second control signal, the dead time that both transistors are turned off is set.

In the drive device, wherein the first charge pump circuit comprises:

a first pump resistor having one end connected to the control terminal of the first transistor;

a first pump bipolar transistor having a collector connected to the first positive power supply wiring, and having a base connected to the other end of the first pump resistor;

a second pump bipolar transistor having a collector connected to an emitter of the first pump bipolar transistor, having a base connected to the other end of the first pump resistor, and having an emitter connected to the output terminal;

a second pump resistor having one end connected to the emitter of the first pump bipolar transistor;

a first pump capacitor having one end connected to the other end of the second pump resistor;

a first pump diode having anode connected to the other end of the first pump capacitor, and having cathode connected to the output terminal;

a second pump diode having a cathode connected to the other end of the first pump capacitor;

a second pump capacitor having one end connected to an anode of the second pump diode, and having the other end connected to the output terminal;

a third pump resistor having one end connected to the anode of the second pump diode, and having the other end connected to the first negative power supply wiring;

a first pump Zener diode having an anode connected to the first negative power supply wiring, and having a cathode connected to the output terminal; and a third pump capacitor having one end connected to the first negative power supply wiring, and having the other end connected to the output terminal.

In the drive device, wherein the second charge pump circuit comprises:

a fourth pump resistor having one end connected to the control terminal of the second transistor;

a third pump bipolar transistor having a collector connected to the second positive power supply wiring, and having a base connected to the other end of the fourth pump resistor;

a fourth pump bipolar transistor having a collector connected to an emitter of the third pump bipolar transistor, having a base connected to the other end of the fourth pump resistor, and having an emitter connected to the ground terminal;

a fifth pump resistor having one end connected to the emitter of the third pump bipolar transistor;

a fourth pump capacitor having one end is connected to the other end of the fifth pump resistor;

a third pump diode having an anode connected to the other end of the fourth pump capacitor, and having a cathode connected to the ground terminal;

a fourth pump diode having a cathode connected to the other end of the fourth pump capacitor;

a fifth pump capacitor having one end connected to the anode of the fourth pump diode, and having the other end connected to the ground terminal;

a sixth pump resistor having one end connected to an anode of the fourth pump diode, and having the other end connected to the second negative power supply wiring;

a second pump Zener diode having an anode connected to the other end of the sixth pump resistor, and having a cathode connected to the ground terminal; and a sixth pump capacitor having one end connected to the second negative power supply wiring, and having the other end connected to the ground terminal.

A method, according to an embodiment according to an aspect of the present invention, for controlling a drive device, the drive device comprising: a power supply terminal to which a DC voltage is applied; a grounding terminal that is grounded; a first transistor having one end connected to the power supply terminal, and having the other end connected to an output terminal; a second transistor having one end connected to the output terminal, and having the other end connected to the ground terminal; a first DC power supply that outputs a first voltage; a first bootstrap circuit that comprises a first bootstrap diode having an anode applied the first voltage and a cathode connected to the first positive power supply wiring, and that comprises a first bootstrap capacitor having one end connected to the cathode of the first bootstrap diode and the other end connected to the output terminal; a first stabilizing capacitor having one end connected to the output terminal, and having the other end connected to the first negative power supply wiring; a first gate driver circuit that controls operations of the first transistor by outputting a first control signal to a control terminal of the first transistor, the first control signal being generated from a first positive power supply voltage of the first positive power supply wiring and a first negative power supply voltage of the first negative power supply wiring; a second gate driver circuit that controls operations of the second transistor so that the first transistor and the second transistor are turned on/off in a complementary manner, by outputting a second control signal to the control terminal of the second transistor, the second control signal being generated from the second positive power supply voltage of the second positive power supply wiring and the second negative power supply voltage of the second negative power supply wiring; and a first charge pump circuit that applies the first negative power supply voltage to the first negative power supply wiring, by generating the first negative power supply voltage having a polarity opposite to that of the first positive power supply voltage with reference to a potential of the output terminal, based on the first control signal, wherein controls operations of the first transistor by outputting a first control signal to a control terminal of the first transistor, the first control signal being generated from a first positive power supply voltage of the first positive power supply wiring and a first negative power supply voltage of the first negative power supply wiring, by the first gate driver circuit;

controlling operations of the second transistor so that the first transistor and the second transistor are turned on/off in a complementary manner, by outputting a second control signal to the control terminal of the second transistor, the second control signal being generated from the second positive power supply voltage of the second positive power supply wiring and the second negative power supply voltage of the second negative power supply wiring, by the second gate driver circuit; and applying the first negative power supply voltage to the first negative power supply wiring, by generating the first negative power supply voltage having a polarity opposite to that of the first positive power supply voltage with reference to a potential of the output terminal, based on the first control signal, by the first charge pump circuit.

Effects of the Invention

A drive device according to an aspect of the present invention includes: a power supply terminal to which a DC voltage is applied; a grounding terminal that is grounded; a first transistor having one end connected to the power supply terminal, and having the other end connected to an output terminal; a second transistor having one end connected to the output terminal, and having the other end connected to the ground terminal; a first DC power supply that outputs a first voltage; a first bootstrap circuit that comprises a first bootstrap diode having an anode applied the first voltage and a cathode connected to the first positive power supply wiring, and that comprises a first bootstrap capacitor having one end connected to the cathode of the first bootstrap diode and the other end connected to the output terminal; a first stabilizing capacitor having one end connected to the output terminal, and having the other end connected to the first negative power supply wiring; a first gate driver circuit that controls operations of the first transistor by outputting a first control signal to a control terminal of the first transistor, the first control signal being generated from a first positive power supply voltage of the first positive power supply wiring and a first negative power supply voltage of the first negative power supply wiring; a second gate driver circuit that controls operations of the second transistor so that the first transistor and the second transistor are turned on/off in a complementary manner, by outputting a second control signal to the control terminal of the second transistor, the second control signal being generated from the second positive power supply voltage of the second positive power supply wiring and the second negative power supply voltage of the second negative power supply wiring; and a first charge pump circuit that applies the first negative power supply voltage to the first negative power supply wiring, by generating the first negative power supply voltage having a polarity opposite to that of the first positive power supply voltage with reference to a potential of the output terminal, based on the first control signal.

In this way, in the drive device of the present invention, the power supply circuit for generating the negative voltage is omitted and the circuit scale is reduced, and a negative power supply voltage is generated from a positive power supply voltage by operating the first charge pump circuit according to the control signal of the first transistor output from the first driver circuit. Thus, the negative power supply voltage is used to secure a margin between the threshold voltage of the first transistor and the control signal when the transistor is off, thereby shortening the dead time.

That is, according to the driving device of the present invention, it is possible to suppress the malfunction of the transistor in a short dead time while reducing the circuit scale.

EMBODIMENTS FOR CARRYING OUT THE INVENTION

Embodiments of the present invention will now be described with reference to the accompanying drawings.

First Embodiment

Figure 1:
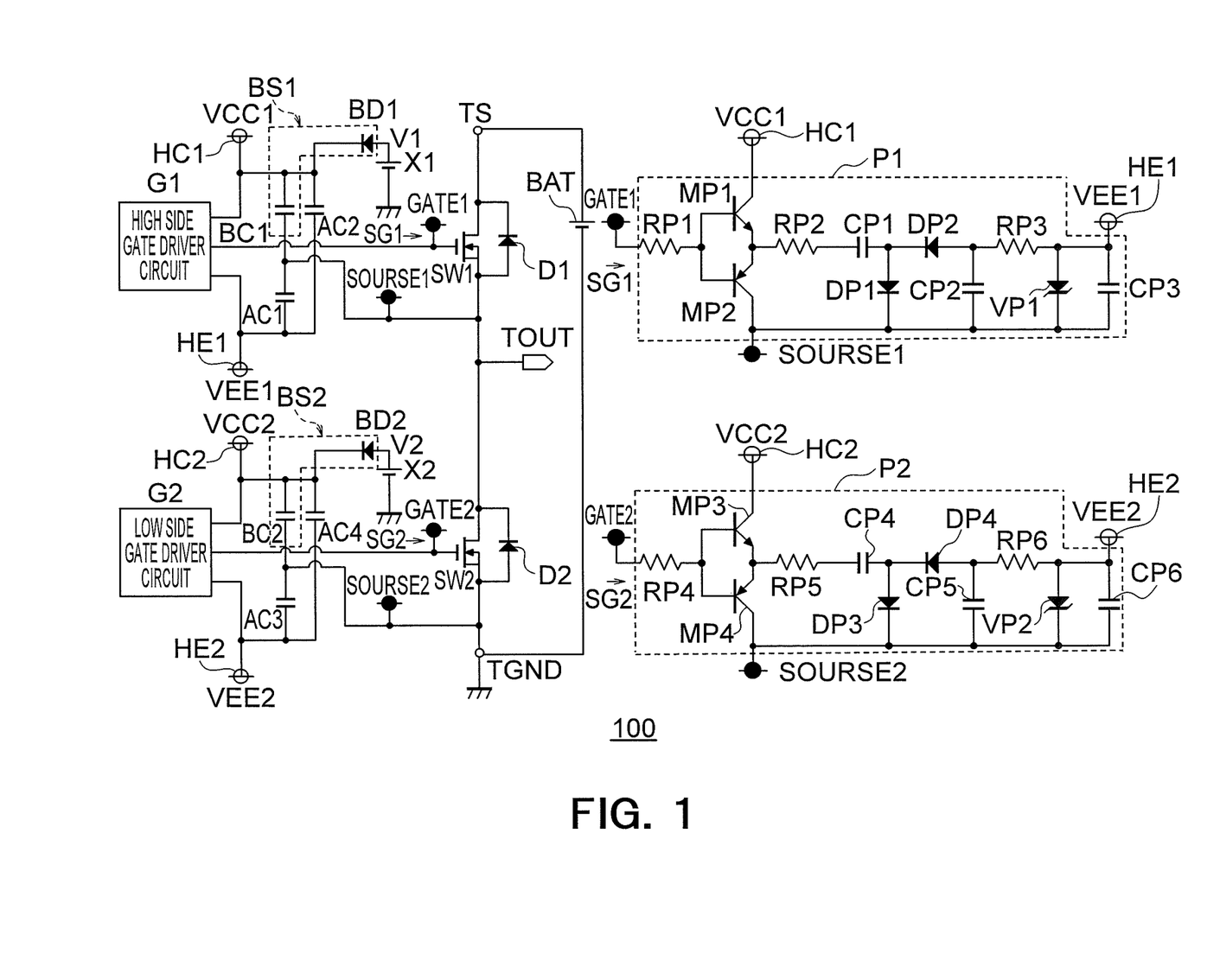
FIG. 1 is a diagram illustrating an example of the configuration of the drive device 100 according to the first embodiment.
Figure 2:
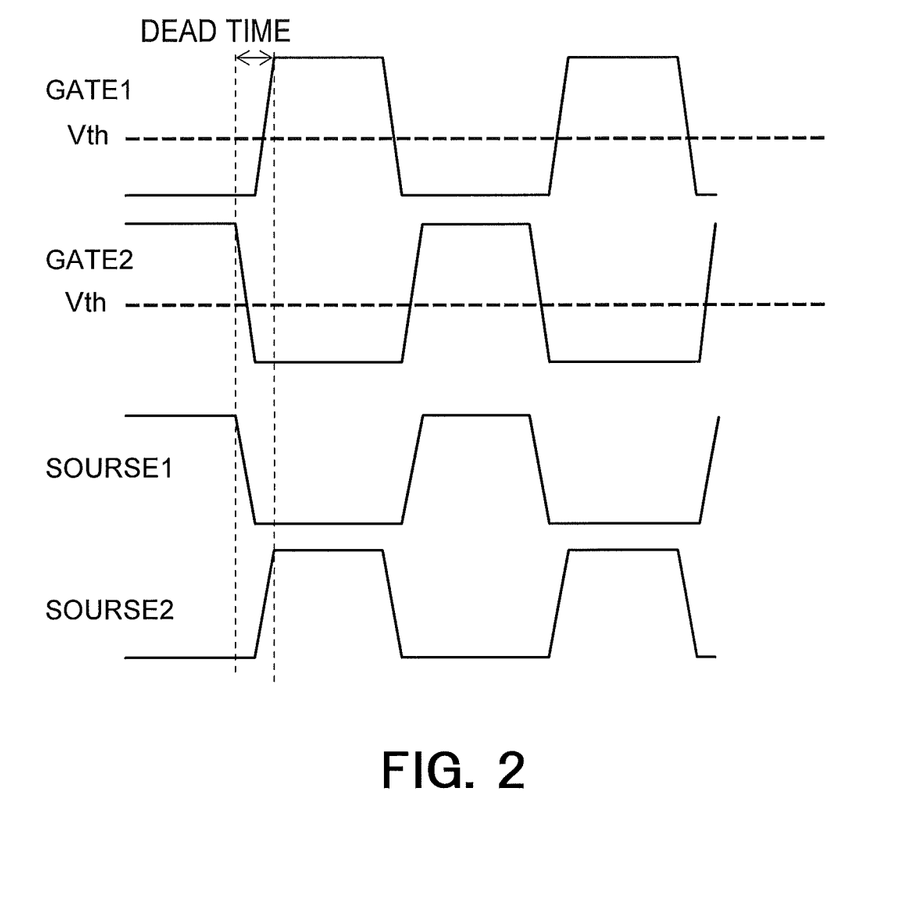
FIG. 2 is a diagram showing an example of operation waveforms of drive device 100 shown in FIG. 1.

FIG. 1 is a diagram illustrating an example of the configuration of the drive device 100 according to the first embodiment. FIG. 2 is a diagram showing an example of operation waveforms of drive device 100 shown in FIG. 1.

As shown in FIG. 1, the drive device 100 outputs a predetermined voltage from the output terminal TOUT, by controlling the first transistor SW1 and the second transistor SW2 to turn on/off in a complementary manner.

Here, for example, as shown in FIG. 1, the drive device 100 includes a power supply terminal TS, a ground terminal TGND, a first transistor SW1, a second transistor SW2, a first body diode D1, a second body diode D2, a first DC (Direct Current) power supply X1, and a second DC power supply X2, a first bootstrap circuit BS1, a first stabilizing capacitor AC1, a second stabilizing capacitor AC2, a second bootstrap circuit BS2, a third stabilizing capacitor AC3, a fourth stabilizing capacitor AC4, a first gate driver circuit G1, a second gate driver circuit G2, a first charge pump circuit P1, and a second charge pump circuit P2.

The power supply terminal TS is connected to the positive electrode of the DC power supply BAT and is applied with a DC voltage.

Also, the ground terminal TGND is connected to the negative electrode of the DC power supply BAT and grounded.

The first transistor (a high side transistor) SW1 has one end (a drain) connected to the power supply terminal TS, and has the other end (a source) connected to the output terminal TOUT.

the first body diode D1 has a cathode of is connected to one end (a drain) of the first transistor SW1, and has an anode connected to the other end (a source) of the first transistor SW1.

Here, the first transistor SW1 is, for example, as shown in FIG. 1, a first n-channel MOS transistor having one end (a drain) connected to the power supply terminal TS and the other end (a source) connected to the output terminal TOUT.

Note that the first transistor SW1 may be an NPN type bipolar transistor.

The second transistor (low side transistor) SW2 has one end (a drain) connected to the output terminal TOUT, and has the other end (a source) connected to the ground terminal TGND.

The second body diode D2 has a cathode connected to one end (a drain) of the second transistor SW2, and has an anode connected to the other end (a source) of the second transistor SW2.

Here, the second transistor SW2 is, for example, as shown in FIG. 1, a second n-channel MOS transistor having one end (a drain) connected to the output terminal TOUT and the other end (a source) connected to the ground terminal TGND.

The second transistor SW2 may be an NPN type bipolar transistor.

Also, the first DC power supply X1 outputs the first voltage V1.

The first DC power supply X1 is, for example, as shown in FIG. 1, a first battery has a negative electrode grounded, and has a positive electrode connected to the anode of the first bootstrap diode BD1.

Further, the first bootstrap circuit BS1 comprises, for example, as shown in FIG. 1, a first bootstrap diode BD1 and a first bootstrap capacitor BC1.

The first bootstrap diode BD1 has, for example, as shown in FIG. 1, an anode connected to the positive electrode of the first DC power supply X1, the first voltage V1 is applied to the anode, and the first bootstrap diode BD1 has a cathode connected to the positive power supply wiring HC1.

Further, for example, as shown in FIG. 1, the first bootstrap capacitor BC1 has one end connected to the cathode of the first bootstrap diode BD1, and has the other end connected to the output terminal TOUT (the first source terminal SOURSE1).

The capacitance value of the first bootstrap capacitor BC1 is set to be equal to the capacitance value of the first stabilizing capacitor AC1, for example.

Also, the first stabilizing capacitor AC1 has one end connected to the output terminal TOUT (First source terminal SOURSE1), and has the other end connected to the first negative power supply wiring HE1.

Also, the second stabilizing capacitor AC2 has one end connected to the cathode of the first bootstrap diode BD1, and has the other end connected to the first negative power supply wiring HE1.

Note that the capacitance value of the first stabilizing capacitor AC1 is set to be larger than the capacitance value of the second stabilizing capacitor AC2.

Also, the first gate driver circuit (the high side gate driver circuit) G1 controls the operation of the first transistor SW1, by outputting the first control signal SG1 to the control terminal (the first gate terminal GATE1) of the first transistor SW1, the first control signal SG1 generated from the first positive power supply voltage VCC1 of the first positive power supply wiring HC1 and the first negative power supply voltage VEE1 of the first negative power supply wiring HE1.

In particular, the first gate driver circuit G1 performs PWM control of the operation of the first transistor SW1 by the first control signal SG1.

Further, the second gate driver circuit (the low side gate driver circuit) G2 controls the operation of the second transistor SW2 so that the first transistor SW1 and the second transistor SW2 are turned on/off in a complementary manner, by outputting the second control signal SG2 to the control terminal (the second gate terminal GATE2) of the second transistor SW2, the second control signal SG2 generated from the second positive power supply voltage VCC2 of the second positive power supply wiring HC2 and the second negative power supply voltage VEE2 of the second negative power supply wiring HE2.

Especially, the second gate driver circuit G2 is designed to perform PWM control of the operation of the second transistor SW2, by the second control signal SG2, so that the first transistor SW1 and the second transistor SW2 are complementarily turned on/off.

Note that, in the relationship between the PWM control of the first transistor SW1 by the first control signal SG1 and the PWM control of the second transistor SW2 by the second control signal SG2, a dead time for turning off both transistors SW1 and SW2 (to prevent the through current) is set (FIG. 2).

Also, the first charge pump circuit P1 is adapted to apply the first negative power supply voltage VEE1 to the first negative power supply wiring HE1, by generating the first negative power supply voltage VEE1 having a polarity opposite to that of the first positive power supply voltage VCC1 with reference to the potential of the output terminal TOUT (the potential of the first source terminal SOURSE1), based on the first control signal SG1 for controlling the first transistor SW1.

In this way, the first charge pump circuit P1 operates as a negative power supply generation circuit.

The first charge pump circuit P1 is connected to the first positive power supply wiring HC1, the first negative power supply wiring HE1, the control terminal (the first gate terminal GATE1) of the first transistor SW1, and the output terminal TOUT (the first source terminal SOURSE1), as shown in FIG. 1, for example.

More specifically, the first charge pump circuit P1 includes a first pump resistor RP1, a first pump bipolar transistor MP1, a second pump bipolar transistor MP2, a second pump resistor RP2, a first pump capacitor CP1, a first pump resistor RP2, a pump diode DP1, a second pump diode DP2, a second pump capacitor CP2, a third pump resistor RP3, a first pump Zener diode VP1, and a third pump capacitor CP3, as shown in FIG. 1, for example.

The first pump resistor RP1 has one end of electrically connected to the control terminal (the first gate terminal GATE1) of the first transistor SW1.

The first pump bipolar transistor MP1 has a collector connected to the first positive power supply wiring HC1, and has a base connected to the other end of the first pump resistor RP1.

The second pump bipolar transistor MP2 has a collector connected to the emitter of the first pump bipolar transistor MP1, has a base connected to the other end of the first pump resistor RP1, and has an emitter connected to the output terminal TOUT (the first source terminal SOURSE1).

Also, the second pump resistor RP2 has one end of connected to the emitter of the first pump bipolar transistor MP1.

Also, the first pump capacitor CP1 has one end connected to the other end of the second pump resistor RP2.

The first pump diode DP1 has an anode connected to the other end of the first pump capacitor CP1, and has a cathode connected to the output terminal TOUT (the first source terminal SOURSE1).

The second pump diode DP2 has a cathode connected to the other end of the first pump capacitor CP1.

The second pump capacitor CP2 has one end connected to the anode of the second pump diode DP2, and has the other end connected to the output terminal TOUT (first source terminal SOURSE1).

Further, the third pump resistor RP3 has one end connected to the anode of the second pump diode DP2 (the one end of the second pump capacitor CP2), and has the other end connected to the first negative power supply wiring HE1.

The first pump Zener diode VP1 has an anode connected to the other end of the third pump resistor RP3 (the first negative power supply wiring HE1), and has a cathode connected to the output terminal TOUT (the first source terminal SOURSE1).

Further, the third pump capacitor CP3 has one end connected to the first negative power supply wiring HE1, and the other end connected to the output terminal TOUT (the first source terminal SOURSE1).

The first charge pump circuit P1 having such a configuration applies the first negative power supply voltage VEE1 to the first negative power supply wiring HE1, by generating the first negative power supply voltage VEE1 having a polarity opposite to that of the first positive power supply voltage VCC1 with reference to the potential of the output terminal TOUT (the potential of the first source terminal SOURSE1), based on the first control signal SG1 for controlling the first transistor SW1.

Also, the second DC power supply X2 outputs the second voltage V2.

The second DC power supply X2 is, for example, as shown in FIG. 1, a second battery having a negative electrode grounded and having a positive electrode connected to the anode of the second bootstrap diode BD2.

The above-mentioned first DC power supply X1 and second DC power supply X2 are described as separate configurations in the example of FIG. 1, but they may be common power supplies.

Further, the second bootstrap circuit BS2 has a second bootstrap diode BD2 and a second bootstrap capacitor BC2, for example, as shown in FIG. 1.

The second bootstrap diode BD2 has an anode connected to the positive electrode of the first DC power supply X1, the second voltage V2 is applied to the anode, and the second bootstrap diode BD2 has a cathode connected to the second positive power supply wiring HC2.

The second bootstrap capacitor BC2 has one end connected to the cathode of the second bootstrap diode BD2, and has the other end connected to the ground terminal TGND (the second source terminal SOURSE2).

Further, the third stabilizing capacitor AC3 has one end connected to the ground terminal TGND (the second source terminal SOURSE2), and has the other end connected to the second negative power supply wiring HE2.

The capacitance value of the second bootstrap capacitor BC2 is set to be equal to the capacitance value of the third stabilizing capacitor AC3, for example.

Also, the fourth stabilizing capacitor AC4 has one end connected to the cathode of the second bootstrap diode BD2, and has the other end connected to the second negative power supply wiring HE2.

Note that the capacitance value of the third stabilizing capacitor AC3 is set to be larger than the capacitance value of the fourth stabilizing capacitor AC4.

Further, the second charge pump circuit P2 is adapted to apply the second negative power supply voltage VEE2 to the second negative power supply wiring HE2, by generating the second negative power supply voltage VEE2 having the opposite polarity to the second positive power supply voltage VCC2 with reference to the potential of the ground terminal TGND (the potential of the second source terminal SOURSE2), based on the second control signal SG2 that controls the second transistor SW2.

In this way, the second charge pump circuit P2 operates as a negative power supply generation circuit.

Note that, as the negative voltage generation circuit, a 3-terminal regulator may be used instead of the second charge pump circuit P2 shown in FIG. 1, the 3-terminal regulator generates a second negative power supply voltage VEE2 having a polarity opposite to that of the second positive power supply voltage VCC2 and applies the second negative power supply voltage VEE2 to the second negative power supply wiring HC2.

The second charge pump circuit P2 is connected to the second positive power supply wiring HC2, the second negative power supply wiring HE2, the control terminal (the second gate terminal GATE2) of the second transistor SW2, and the ground terminal TGND (the second source terminal SOURSE2), for example, as shown in FIG. 1.

More specifically, the second charge pump circuit P2 includes a fourth pump resistor RP4, a third pump bipolar transistor MP3, a fourth pump bipolar transistor MP4, a fifth pump resistor RP5, a fourth pump capacitor CP4, a third pump resistor RP5, a pump diode DP3, a fourth pump diode DP4, a fifth pump capacitor CP5, a sixth pump resistor RP6, a second pump Zener diode VP2, and a sixth pump capacitor CP6, as shown in FIG. 1, for example.

The fourth pump resistor RP4 has one end electrically connected to the control terminal (the second gate terminal GATE2) of the second transistor SW2.

The third pump bipolar transistor MP3 has a collector connected to the second positive power supply wiring HC2, and has the base connected to the other end of the fourth pump resistor RP4.

The fourth pump bipolar transistor MP4 has a collector connected to the emitter of the third pump bipolar transistor MP3, has a base connected to the other end of the fourth pump resistor RP4, and has an emitter is connected to the ground terminal TGND (the second source terminal SOURSE2).

Also, the fifth pump resistor RP5 has one end connected to the emitter of the third pump bipolar transistor MP3.

Further, the fourth pump capacitor CP4 has one end connected to the other end of the fifth pump resistor RP5.

In addition, the third pump diode DP3 has an anode connected to the other end of the fourth pump capacitor CP4, and has a cathode connected to the ground terminal TGND (the second source terminal SOURSE2).

The fourth pump diode DP4 has a cathode connected to the other end of the fourth pump capacitor CP4.

The fifth pump capacitor CP5 has one end connected to the anode of the fourth pump diode CP4, and has the other end connected to the ground terminal TGND (the second source terminal SOURSE2).

Also, the sixth pump resistor RP6 has one end connected to the anode of the fourth pump diode DP4 (the one end of the fifth pump capacitor CP5), and has the other end connected to the second negative power supply wiring HE2.

The second pump Zener diode VP2 has an anode connected to the other end of the sixth pump resistor RP6 (the second negative power supply wiring HE2), and has a cathode connected to the ground terminal TGND (the second source terminal SOURSE2).

Further, the sixth pump capacitor CP6 has one end connected to the second negative power supply wiring HE2, and has the other end connected to the ground terminal TGND (the second source terminal SOURSE2).

The second charge pump circuit P2 having such a configuration applies to the second negative power supply wiring HE2, by generating the second negative power supply voltage VEE2 having the opposite polarity to the second positive power supply voltage VCC2 with reference to the potential of the ground terminal TGND (the potential of the second source terminal SOURSE2), based on the second control signal SG2 that controls the second transistor SW2.

Here, an example of a control method of the drive device 100 having the above configuration will be described.

As described above, the first gate driver circuit G1 outputs the first control signal SG1 to the control terminal (the first gate terminal GATE1) of the first transistor SW1 to control the operation of the first transistor SW1, the first control signal SG1 is generated from the first positive power supply voltage VCC1 of the first positive power supply wiring HC1 and the first negative power supply voltage VEE1 of the first negative power supply wiring HE1.

Further, the second gate driver circuit G2 outputs the second control signal SG2 to the control terminal (the second gate terminal GATE2) of the second transistor SW2, to control the operation of the second transistor SW2 so that the first transistor SW1 and the second transistor SW2 are complementarily turned on/off, the second control signal SG2 is generated from the second positive power supply voltage VCC2 of the second positive power supply wiring HC2 and the second negative power supply voltage VEE2 of the second negative power supply wiring HE2.

With this, the first transistor SW1 and the second transistor SW2 are controlled to be turned on/off in a complementary manner, and a predetermined voltage is output from the output terminal TOUT.

On the other hand, as described above, the first charge pump circuit P1 applies the first negative power supply voltage VEE1 to the first negative power supply wiring HE1, by generating a first negative power supply voltage VEE1 having a polarity opposite to that of the first positive power supply voltage VCC1 with reference to the potential of the output terminal TOUT (the potential of the first source terminal SOURSE1), based on the first control signal SG1 for controlling the first transistor SW1.

Further, the second charge pump circuit P2 applies the second negative power supply voltage VEE2 to the second negative power supply wiring HE2, by generating the second negative power supply voltage VEE2 having the opposite polarity to the second positive power supply voltage VCC2 with reference to the potential of the ground terminal TGND (the potential of the second source terminal SOURSE2), based on the second control signal SG2 that controls the second transistor SW2.

Therefore, the drive device 100 according to the first embodiment, the circuit scale is reduced by omitting the power supply circuit for generating the negative voltage. Further, in the driving device of the present invention, the first charge pump circuit is operated by the control signal of the first transistor output from the first driver circuit to generate the negative power supply voltage from the positive power supply voltage. Thus, the dead time is shortened by securing a margin between the threshold voltage Vth of the first transistor and the control signal (the gate voltage) at the time of off by using the negative power supply voltage (FIG. 2).

That is, according to the drive device 100 according to the second embodiment, it is possible to reduce the circuit scale and suppress the malfunction of the transistor in a short dead time.

In the drive device 100 according to the first embodiment, if necessary, any or all of the second stabilizing capacitor AC2, the second bootstrap diode BD2 of the second bootstrap circuit BS2, and the fourth stabilizing capacitors AC4 may be omitted.

Second Embodiment

As described above, in the driving apparatus 100 according to the first embodiment, if necessary, any or all of the second stabilizing capacitor AC2, the second bootstrap diode BD2 of the second bootstrap circuit BS2, and the fourth stabilizing capacitors AC4 may be omitted.

Therefore, in the second embodiment, another configuration example of the drive device in which the above configuration is omitted will be described.

Figure 3:
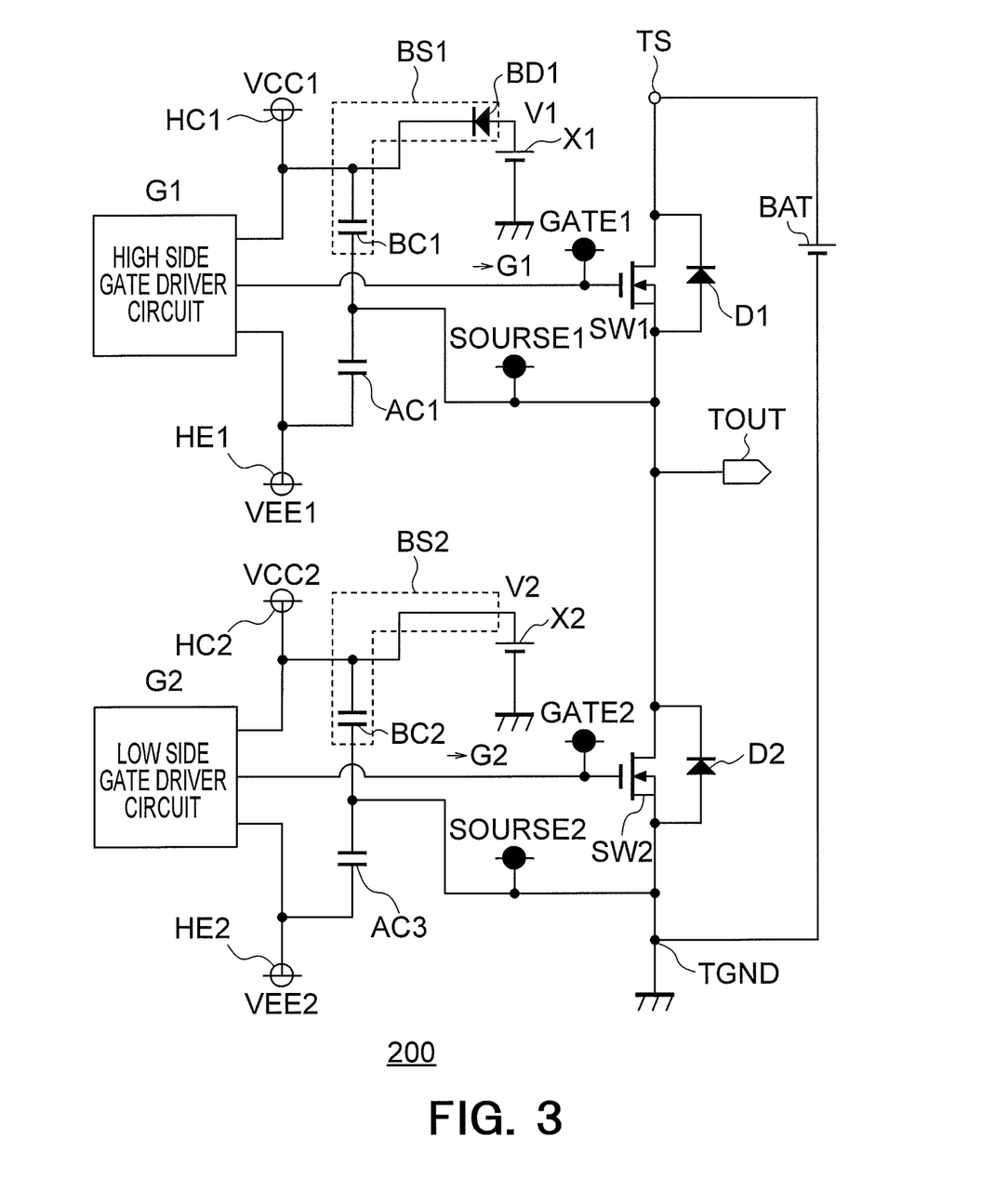
FIG. 3 is a diagram illustrating an example of the configuration of the drive device 200 according to the second embodiment.

Here, FIG. 3 is a diagram illustrating an example of the configuration of the drive device 200 according to the second embodiment. In FIG. 3, the same reference numerals as those in FIG. 1 indicate the same configurations as those in the first embodiment.

The drive device 200 according to the second embodiment has, for example, as shown in FIG. 3, a configuration in which the second stabilizing capacitor AC2, the fourth stabilizing capacitor AC4 and the second bootstrap diode BD2 of the second bootstrap circuit BS2 are omitted, compared with the driving device 100 of the first embodiment.

The other configurations of the drive device according to the second embodiment are similar to those of the first embodiment shown in FIG. 1.

Therefore, the drive device 200 according to the second embodiment, as in the first embodiment, the circuit scale is reduced by omitting the power supply circuit for generating the negative voltage. Further, in the driving device of the present invention, the first charge pump circuit is operated by the control signal of the first transistor output from the first driver circuit to generate the negative power supply voltage from the positive power supply voltage. Thus, the dead time is shortened by securing a margin between the threshold voltage Vth of the first transistor and the control signal (the gate voltage) at the time of off by using the negative power supply voltage (FIG. 2).

That is, according to the drive device 200 according to the second embodiment, it is possible to reduce the circuit scale and suppress the malfunction of the transistor in a short dead time.

As described above, the drive device according to one aspect of the present invention comprises: a power supply terminal TS to which a DC voltage is applied; a grounding terminal TGND that is grounded; a first transistor SW1 having one end connected to the power supply terminal TS, and having the other end connected to an output terminal TOUT; a second transistor SW2 having one end connected to the output terminal TOUT, and having the other end connected to the ground terminal TGND; a first DC power supply X1 that outputs a first voltage V1; a first bootstrap circuit BS1 that comprises a first bootstrap diode BD1 having an anode applied the first voltage V1 and a cathode connected to the first positive power supply wiring HC1, and that comprises a first bootstrap capacitor BC1 having one end connected to the cathode of the first bootstrap diode BD1 and the other end connected to the output terminal TOUT (SOURSE1); a first stabilizing capacitor AC1 having one end connected to the output terminal TOUT (SOURSE1), and having the other end connected to the first negative power supply wiring (VEE1); a first gate driver circuit G1 that controls operations of the first transistor SW1 by outputting a first control signal SG1 to a control terminal (a gate) of the first transistor, the first control signal being generated from a first positive power supply voltage of the first positive power supply wiring and a first negative power supply voltage of the first negative power supply wiring; a second gate driver circuit G2 that controls operations of the second transistor SW2 so that the first transistor and the second transistor are turned on/off in a complementary manner, by outputting a second control signal SG2 to the control terminal (a gate) of the second transistor, the second control signal being generated from the second positive power supply voltage of the second positive power supply wiring and the second negative power supply voltage of the second negative power supply wiring; and a first charge pump circuit P1 that applies the first negative power supply voltage VEE1 to the first negative power supply wiring, by generating the first negative power supply voltage VEE1 having a polarity opposite to that of the first positive power supply voltage VCC1 with reference to a potential of the output terminal TOUT (the potential of the first source terminal SOURSE1), based on the first control signal SG1.

In this way, in the drive device of the present invention, the circuit scale is reduced by omitting the power supply circuit for generating the negative voltage. Further, in the driving device of the present invention, the first charge pump circuit is operated by the control signal of the first transistor output from the first driver circuit to generate the negative power supply voltage from the positive power supply voltage. Thus, the dead time is shortened by securing a margin between the threshold voltage Vth of the first transistor and the control signal (the gate voltage) at the time of off by using the negative power supply voltage (FIG. 2).

That is, according to the driving device of the present invention, it is possible to reduce the circuit scale and suppress the malfunction of the transistor in a short dead time.

While certain embodiments have been described, these embodiments have been presented by way of example only, and are not intended to limit the scope of the inventions. The embodiments may be embodied in a variety of other forms. Furthermore, various omissions, substitutions and changes in the form of the methods and systems described herein may be made without departing from the spirit of the inventions. The embodiments and their modifications are included in the scope and the subject matter of the invention, and at the same time included in the scope of the claimed inventions and their equivalents.

EXPLANATION OF REFERENCES

100 Drive device
TS Power supply terminal
TGND Ground terminal
SW1 First transistor
SW2 Second transistor
D1 First body diode
D2 Second body diode
X1 First DC power supply
X2 Second DC power supply
BS1 First bootstrap circuit
BS2 Second bootstrap circuit
AC1 First stabilizing capacitor
AC2 Second stabilizing capacitor
AC3 Third stabilizing capacitor
AC4 Fourth stabilizing capacitor
G1 First gate driver circuit
G2 Second gate driver circuit
P1 First charge pump circuit
P2 Second charge pump circuit
RP1 First pump resistance
RP2 Second pump resistance
RP3 Third pump resistor
RP4 Fourth pump resistance
RP5 Fifth pump resistance
RP6 Sixth pump resistance
MP1 First pump bipolar transistor
MP2 Second pump bipolar transistor
MP3 Third pump bipolar transistor
MP4 Fourth pump bipolar transistor
CP1 First pump condenser
CP2 Second condenser for pump
CP3 Third pump condenser
CP4 Fourth condenser for pump
CP5 Fifth pump condenser
CP6 Sixth pump condenser
DP1 First pump diode
DP2 Second pump diode
DP3 Third pump diode
DP4 Fourth pump diode
VP1 First Zener diode for pump
VP2 Second Zener diode for pump

The invention claimed is:
1. A drive device comprising:
a power supply terminal to which a DC voltage is applied;
a ground terminal that is grounded;
a first transistor having one end connected to the power supply terminal, and having the other end connected to an output terminal;
a second transistor having one end connected to the output terminal, and having the other end connected to the ground terminal;
a first DC power supply that outputs a first voltage;
a first bootstrap circuit that comprises a first bootstrap diode having an anode applied the first voltage and a cathode connected to a first positive power supply wiring, and that comprises a first bootstrap capacitor having one end connected to the cathode of the first bootstrap diode and the other end connected to the output terminal;
a first stabilizing capacitor having one end connected to the output terminal, and having the other end connected to a first negative power supply wiring;
a first gate driver circuit that controls operations of the first transistor by outputting a first control signal to a control terminal of the first transistor, the first control signal being generated from a first positive power supply voltage of the first positive power supply wiring and a first negative power supply voltage of the first negative power supply wiring;
a second gate driver circuit that controls operations of the second transistor so that the first transistor and the second transistor are turned on/off in a complementary manner, by outputting a second control signal to the control terminal of the second transistor, the second control signal being generated from a second positive power supply voltage of the second positive power supply wiring and a second negative power supply voltage of the second negative power supply wiring;

a first charge pump circuit that applies the first negative power supply voltage to the first negative power supply wiring, by generating the first negative power supply voltage having a polarity opposite to that of the first positive power supply voltage with reference to a potential of the output terminal, based on the first control signal;

a second DC power supply that outputs a second voltage;

a second bootstrap circuit that comprises a second bootstrap diode having an anode applied the second voltage and having a cathode connected to the second positive power supply wiring, and a second bootstrap capacitor having one end connected to the cathode of the second bootstrap diode and having the other end connected to the ground terminal;

a third stabilizing capacitor having one end connected to the ground terminal, and having the other end connected to the second negative power supply wiring;

a fourth stabilizing capacitor having one end connected to the cathode of the second bootstrap diode, and having the other end connected to the second negative power supply wiring; and a second charge pump circuit that applies the second negative power supply voltage to the second negative power supply wiring, by generating the second negative power supply voltage having a polarity opposite to that of the second positive power supply voltage with reference to the potential of the ground terminal, based on the second control signal.

2. The drive device according to claim 1, wherein the first transistor is a first n-channel MOS transistor having one end connected to the power supply terminal and the other end connected to the output terminal, and wherein the second transistor is a second n-channel MOS transistor having one end connected to the output terminal and the other end connected to the ground terminal.

3. The drive device according to claim 1, further comprising:

a second stabilizing capacitor having one end connected to the cathode of the first bootstrap diode, and having the other end connected to the first negative power supply wiring.

4. The drive device according to claim 3, wherein a capacitance value of the first stabilizing capacitor is set to be larger than a capacitance value of the second stabilizing capacitor.

5. The drive device according to claim 1, wherein the first charge pump circuit is connected to the first positive power supply wiring, the first negative power supply wiring, the control terminal of the first transistor, and the output terminal.

6. The drive device according to claim 5, wherein the first charge pump circuit comprises:

a first pump resistor having one end connected to the control terminal of the first transistor;

a first pump bipolar transistor having a collector connected to the first positive power supply wiring, and having a base connected to the other end of the first pump resistor;

a second pump bipolar transistor having a collector connected to an emitter of the first pump bipolar transistor, having a base connected to the other end of the first pump resistor, and having an emitter connected to the output terminal;

a second pump resistor having one end connected to the emitter of the first pump bipolar transistor;

a first pump capacitor having one end connected to the other end of the second pump resistor;

a first pump diode having anode connected to the other end of the first pump capacitor, and having cathode connected to the output terminal;

a second pump diode having a cathode connected to the other end of the first pump capacitor;

a second pump capacitor having one end connected to an anode of the second pump diode, and having the other end connected to the output terminal;

a third pump resistor having one end connected to the anode of the second pump diode, and having the other end connected to the first negative power supply wiring;

a first pump Zener diode having an anode connected to the first negative power supply wiring, and having a cathode connected to the output terminal; and a third pump capacitor having one end connected to the first negative power supply wiring, and having the other end connected to the output terminal.

7. The drive device according to claim 1, wherein the second charge pump circuit is connected to the second positive power supply wiring, the second negative power supply wiring, the control terminal of the second transistor, and the ground terminal.

8. The drive device according to claim 7, wherein the second charge pump circuit comprises:

a fourth pump resistor having one end connected to the control terminal of the second transistor;

a third pump bipolar transistor having a collector connected to the second positive power supply wiring, and having a base connected to the other end of the fourth pump resistor;

a fourth pump bipolar transistor having a collector connected to an emitter of the third pump bipolar transistor, having a base connected to the other end of the fourth pump resistor, and having an emitter connected to the ground terminal;

a fifth pump resistor having one end connected to the emitter of the third pump bipolar transistor;

a fourth pump capacitor having one end is connected to the other end of the fifth pump resistor;

a third pump diode having an anode connected to the other end of the fourth pump capacitor, and having a cathode connected to the ground terminal;

a fourth pump diode having a cathode connected to the other end of the fourth pump capacitor;

a fifth pump capacitor having one end connected to the anode of the fourth pump diode, and having the other end connected to the ground terminal;

a sixth pump resistor having one end connected to an anode of the fourth pump diode, and having the other end connected to the second negative power supply wiring;

a second pump Zener diode having an anode connected to the other end of the sixth pump resistor, and having a cathode connected to the ground terminal; and a sixth pump capacitor having one end connected to the second negative power supply wiring, and having the other end connected to the ground terminal.

9. The drive device according to claim 1, wherein a capacitance value of the second bootstrap capacitor is set to be equal to a capacitance value of the third stabilizing capacitor.

10. The drive device according to claim 9,
wherein a capacitance value of the third stabilizing capacitor is set to be larger than a capacitance value of the fourth stabilizing capacitor.

11. The drive device according to claim 1,
wherein the first gate driver circuit PWM-controls the operation of the first transistor by the first control signal, and
wherein the second gate driver circuit PWM-controls the operation of the second transistor so that the first transistor and the second transistor are turned on/off in a complementary manner, by the second control signal.

12. The drive device according to claim 11,
wherein, in the relationship between the PWM control of the first transistor by the first control signal and the PWM control of the second transistor by the second control signal, the dead time that both transistors are turned off is set.

13. A drive device comprising:
a power supply terminal to which a DC voltage is applied;
a ground terminal that is grounded;
a first transistor having one end connected to the power supply terminal, and having the other end connected to an output terminal;
a second transistor having one end connected to the output terminal, and having the other end connected to the ground terminal;
a first DC power supply that outputs a first voltage;
a first bootstrap circuit that comprises a first bootstrap diode having an anode applied the first voltage and a cathode connected to a first positive power supply wiring, and that comprises a first bootstrap capacitor having one end connected to the cathode of the first bootstrap diode and the other end connected to the output terminal;
a first stabilizing capacitor having one end connected to the output terminal, and having the other end connected to a first negative power supply wiring;
a first gate driver circuit that controls operations of the first transistor by outputting a first control signal to a control terminal of the first transistor, the first control signal being generated from a first positive power supply voltage of the first positive power supply wiring and a first negative power supply voltage of the first negative power supply wiring;
a second gate driver circuit that controls operations of the second transistor so that the first transistor and the second transistor are turned on/off in a complementary manner, by outputting a second control signal to the control terminal of the second transistor, the second control signal being generated from a second positive power supply voltage of the second positive power supply wiring and a second negative power supply voltage of the second negative power supply wiring; and
a first charge pump circuit that applies the first negative power supply voltage to the first negative power supply wiring, by generating the first negative power supply voltage having a polarity opposite to that of the first positive power supply voltage with reference to a potential of the output terminal, based on the first control signal,
wherein a capacitance value of the first bootstrap capacitor is set to be equal to a capacitance value of the first stabilizing capacitor.

14. A method for controlling a drive device, the drive device comprising: a power supply terminal to which a DC voltage is applied; a ground terminal that is grounded; a first transistor having one end connected to the power supply terminal, and having the other end connected to an output terminal; a second transistor having one end connected to the output terminal, and having the other end connected to the ground terminal; a first DC power supply that outputs a first voltage; a first bootstrap circuit that comprises a first bootstrap diode having an anode applied the first voltage and a cathode connected to a first positive power supply wiring, and that comprises a first bootstrap capacitor having one end connected to the cathode of the first bootstrap diode and the other end connected to the output terminal; a first stabilizing capacitor having one end connected to the output terminal, and having the other end connected to a first negative power supply wiring; a first gate driver circuit that controls operations of the first transistor by outputting a first control signal to a control terminal of the first transistor, the first control signal being generated from a first positive power supply voltage of the first positive power supply wiring and a first negative power supply voltage of the first negative power supply wiring; a second gate driver circuit that controls operations of the second transistor so that the first transistor and the second transistor are turned on/off in a complementary manner, by outputting a second control signal to the control terminal of the second transistor, the second control signal being generated from a second positive power supply voltage of the second positive power supply wiring and a second negative power supply voltage of the second negative power supply wiring; a first charge pump circuit that applies the first negative power supply voltage to the first negative power supply wiring, by generating the first negative power supply voltage having a polarity opposite to that of the first positive power supply voltage with reference to a potential of the output terminal, based on the first control signal;

a second DC power supply that outputs a second voltage; a second bootstrap circuit that comprises a second bootstrap diode having an anode applied the second voltage and having a cathode connected to the second positive power supply wiring, and a second bootstrap capacitor having one end connected to the cathode of the second bootstrap diode and having the other end connected to the ground terminal; a third stabilizing capacitor having one end connected to the ground terminal, and having the other end connected to the second negative power supply wiring; a fourth stabilizing capacitor having one end connected to the cathode of the second bootstrap diode, and having the other end connected to the second negative power supply wiring; and a second charge pump circuit that applies the second negative power supply voltage to the second negative power supply wiring, by generating the second negative power supply voltage having a polarity opposite to that of the second positive power supply voltage with reference to the potential of the ground terminal, based on the second control signal,
    wherein
    controls operations of the first transistor by outputting a first control signal to a control terminal of the first transistor, the first control signal being generated from a first positive power supply voltage of the first positive power supply wiring and a first negative power supply voltage of the first negative power supply wiring, by the first gate driver circuit;
    controlling operations of the second transistor so that the first transistor and the second transistor are turned on/off in a complementary manner, by outputting a second control signal to the control terminal of the second transistor, the second control signal being generated from the second positive power supply voltage of the second positive power supply wiring and a second negative power supply voltage of the second negative power supply wiring, by the second gate driver circuit; and applying the first negative power supply voltage to the first negative power supply wiring, by generating the first negative power supply voltage having a polarity opposite to that of the first positive power supply voltage with reference to a potential of the output terminal, based on the first control signal, by the first charge pump circuit.

15. A method for controlling a drive device, the drive device comprising: a power supply terminal to which a DC voltage is applied; a ground terminal that is grounded;

a first transistor having one end connected to the power supply terminal, and having the other end connected to an output terminal; a second transistor having one end connected to the output terminal, and having the other end connected to the ground terminal; a first DC power supply that outputs a first voltage; a first bootstrap circuit that comprises a first bootstrap diode having an anode applied the first voltage and a cathode connected to a first positive power supply wiring, and that comprises a first bootstrap capacitor having one end connected to the cathode of the first bootstrap diode and the other end connected to the output terminal; a first stabilizing capacitor having one end connected to the output terminal, and having the other end connected to a first negative power supply wiring; a first gate driver circuit that controls operations of the first transistor by outputting a first control signal to a control terminal of the first transistor, the first control signal being generated from a first positive power supply voltage of the first positive power supply wiring and a first negative power supply voltage of the first negative power supply wiring; a second gate driver circuit that controls operations of the second transistor so that the first transistor and the second transistor are turned on/off in a complementary manner, by outputting a second control signal to the control terminal of the second transistor, the second control signal being generated from a second positive power supply voltage of the second positive power supply wiring and a second negative power supply voltage of the second negative power supply wiring; and a first charge pump circuit that applies the first negative power supply voltage to the first negative power supply wiring, by generating the first negative power supply voltage having a polarity opposite to that of the first positive power supply voltage with reference to a potential of the output terminal, based on the first control signal, wherein controls operations of the first transistor by outputting a first control signal to a control terminal of the first transistor, the first control signal being generated from a first positive power supply voltage of the first positive power supply wiring and a first negative power supply voltage of the first negative power supply wiring, by the first gate driver circuit;

controlling operations of the second transistor so that the first transistor and the second transistor are turned on/off in a complementary manner, by outputting a second control signal to the control terminal of the second transistor, the second control signal being generated from the second positive power supply voltage of the second positive power supply wiring and the second negative power supply voltage of the second negative power supply wiring, by the second gate driver circuit; and applying the first negative power supply voltage to the first negative power supply wiring, by generating the first negative power supply voltage having a polarity opposite to that of the first positive power supply voltage with reference to a potential of the output terminal, based on the first control signal, by the first charge pump circuit, and wherein a capacitance value of the first bootstrap capacitor is set to be equal to a capacitance value of the first stabilizing capacitor.

\* \* \* \* \*